UNITED STATES PATENT OFFICE.

THOMAS MACFARLANE, OF OTTAWA, CANADA.

PROCESS OF EXTRACTING NICKEL FROM ORES.

SPECIFICATION forming part of Letters Patent No. 484,033, dated October 11, 1892.

Application filed August 12, 1891. Serial No. 402,457. (No specimens.)

*To all whom it may concern:*

Be it known that I, THOMAS MACFARLANE, a subject of the Queen of Great Britain, residing in Ottawa, Canada, have invented certain Improvements in the Art of Extracting Nickel from Ores, of which the following is a specification.

This invention affords an improved means for extracting nickel from ores containing it, which is especially applicable for use with ores which are rich in sulphur. Nickel has heretofore been recovered from such ores by subjecting them to smelting processes; but my invention provides a means whereby the nickel in the ore is converted into a soluble nickel salt, which is dissolved out and the metallic nickel recovered from the solution.

In practicing my invention I take the ore commonly known as "nickeliferous pyrrhotite" or "magnetic pyrites," in which from one to four per cent. of the iron or about those quantities are replaced by nickel, and after freeing it as much as possible from gangue or rock or silicious matter I roast it either in heaps or kilns or reverberatory furnaces in order to burn off the greater part of the sulphur or utilize it for manufacturing sulphuric acid. I then take the roasted ore and mix it with about equal parts of unroasted ore and an amount of common salt (chloride of sodium) equal to about one-eighth of the ore employed and reduce this mixture to powder by crushing and sifting it in mills and through sieves or other apparatus suitable for the purpose. The resulting mixture should be fine enough to pass through a sieve having eight holes to the lineal inch. The raw ore can also be used unmixed with any previously roasted and ground to powder along with the proportion of common salt above indicated. When residual proto or per chloride of iron can be obtained at a low price it, may be substituted for the sodium chloride. I then introduce the mixture into reverberatory, muffle, mechanical, or revolving furnaces and calcine it at a low red heat, with frequent stirring until sulphurous gases are no longer given off; but in their place a strong odor of chlorine is evolved when the charge is withdrawn from the furnace. During the calcination samples may also be taken from time to time of the ore and tested by ascertaining in the usual manner known to chemists whether on leaching them out with water any protochloride of iron is contained in the solution. As soon as the solution shows itself to be comparatively free from protochloride of iron the charge is withdrawn from the furnace. In this process the chlorine of the common salt is transferred to the nickel and most of the chlorides of iron first formed are decomposed. Great care must be taken not to allow the charge to remain too long in the furnace; otherwise the chloride of nickel will be decomposed into oxide. The acid vapors which are produced during this calcining or roasting process may be withdrawn from the furnace and carried through coke-tower condensers, such as are commonly used in chemical works, and the acid liquor thus obtained may be utilized for various purposes. I next take the calcined ore and dissolve out the chloride of nickel and other soluble substances contained in it with hot water, which operation is carried out in water-tight wooden boxes or vats, furnished with a perforated false bottom, upon which is laid a filtering-bed of ashes, coke, or pine branches. The leaching is continued until no more nickel is removable, and the weak solutions are used for the treatment of charges of ore fresh from the furnace. The residual ore remaining in the vats may be used as an iron ore or for fettling in the manufacture of iron. I next take the solution obtained from the lixiviation of the calcined ore and add to it a small quantity of a solution of caustic soda, sufficient to precipitate any peroxide of iron that may be present, a weak solution being employed for this purpose. To the filtrate from this precipitate a small quantity of a solution of sodium sulphide is added in order to precipitate in advance of the nickel any copper that may be present. The solution filtered from the copper sulphide is then treated with a solution of caustic soda of sufficient strength, which throws down all the nickel present as green hydrated oxide. This oxide is then washed, dried, and reduced to metallic nickel by any of the methods known to chemists. I prefer to make it up into a paste with the requisite quantity of wheat or other flour, roll out the paste, cut it into cubes, dry these, and expose them to a strong heat in plumbago crucibles.

I claim as my invention the following-defined features or improvements, substantially as hereinbefore specified, namely:

1. The process of extracting nickel from ores, consisting in calcining or roasting the ore with a chloride, dissolving out the resulting chloride of nickel, adding a weak alkali to the solution to decompose the perchloride of iron contained therein and precipitate hydrated peroxide, and subsequently recovering the nickel from the decanted solution.

2. The process of extracting nickel from ores, consisting in calcining or roasting the ore with a chloride, dissolving out the resulting nickel salts, adding sodium sulphide to the solution to precipitate the copper therefrom, and subsequently recovering the nickel from the decanted solution.

3. The process of extracting nickel from ores, consisting in calcining or roasting the ore with a chloride, dissolving out the resulting chloride of nickel, adding a weak alkali to the solution to precipitate out the peroxide of iron, then precipitating out the copper, then adding a strong alkali to precipitate oxide of nickel, and reducing this oxide to metallic nickel.

4. The process of extracting nickel from ores rich in sulphur, consisting in first roasting the ore to expel the excess of sulphur, then mixing raw ore and a chloride with the ore, calcining it, dissolving out the nickel salt, and recovering the nickel from the solution.

5. The process of extracting nickel from ores rich in sulphur, consisting in first roasting the ore to expel the excess of sulphur, then mixing sodium chloride with the ore, then calcining the mixture until sulphur fumes cease to be given off and chlorine fumes appear, and until protochloride of iron is eliminated, then leaching the resulting ore first with hot water to dissolve out the chloride of nickel, adding weak alkali to the solution to precipitate peroxide of iron, adding sodium sulphide to precipitate copper, adding a strong alkali to precipitate oxide of nickel, and finally reducing this oxide to metallic nickel.

In witness whereof I have hereunto signed my name in the presence of two subscribing witnesses.

THOMAS MACFARLANE.

Witnesses:
JAMES WATSON,
THOMAS CASEY.